(12) United States Patent
Maegawa et al.

(10) Patent No.: US 6,424,516 B2
(45) Date of Patent: Jul. 23, 2002

(54) CONDUCTIVE PASTE AND CERAMIC ELECTRONIC COMPONENT

(75) Inventors: Kiyotaka Maegawa, Hikone; Kunihiko Hamada, Moriyama, both of (JP)

(73) Assignee: Murata Manufacturing Co., Ltd. (JP)

(*) Notice: Subject to any disclaimer, the term of this patent is extended or adjusted under 35 U.S.C. 154(b) by 0 days.

(21) Appl. No.: 09/870,552

(22) Filed: May 30, 2001

(30) Foreign Application Priority Data

May 31, 2000 (JP) .......................................... 12-163173

(51) Int. Cl.[7] .......................... H01G 4/008; B32B 9/00

(52) U.S. Cl. .................... 361/305; 361/303; 361/321.2; 361/321.5; 428/701

(58) Field of Search ............................... 361/303, 305, 361/306.3, 309, 321.2, 321.3, 321.4, 321.5; 428/701, 702; 252/500, 512, 514

(56) References Cited

U.S. PATENT DOCUMENTS 6,225,392 B1 * 5/2001 Sunahara ................... 106/1.14
6,265,090 B1 * 7/2001 Nishide et al. ............. 252/500

FOREIGN PATENT DOCUMENTS

JP 9-97733 * 4/1997
JP 10-012481 1/1998

* cited by examiner

Primary Examiner—Anthony Dinkins
(74) Attorney, Agent, or Firm—Ostrolenk, Faber, Gerb & Soffen, LLP

(57) ABSTRACT

A conductive paste capable of forming a terminal electrode in which sintering proceeds while the viscosity of the glass is maintained during the sintering of the conductive component, so that the softened glass is prevented from flowing into the interface between the ceramic element assembly and the terminal electrode or from flowing on the surface of the terminal electrode, and furthermore, sufficient glass remains in the cavity of the terminal electrode film, so that an excellent seal is provided against the penetration of the plating solution, and the so-called "adhesion defect" is prevented from occurring, is provided. In addition, a ceramic electronic component is provided. The conductive paste is composed of a conductive component containing at least one of Cu and Ni, a glass frit and an organic vehicle, in which the glass frit contains a crystallizable glass, and the sintering starting temperature of the conductive component is higher than the crystallization starting temperature of the crystallizable glass and lower than the remelting temperature of the crystallizable glass.

18 Claims, 1 Drawing Sheet

CONDUCTIVE PASTE AND CERAMIC ELECTRONIC COMPONENT

BACKGROUND OF THE INVENTION

1. Field of the Invention

The present invention relates to a conductive paste and a ceramic electronic component.

2. Description of the Related Art

Hitherto, a ceramic electronic component has been composed of, for example, a ceramic element assembly, an internal electrode and a terminal electrode. The ceramic element assembly is produced by, for example, baking a green laminate in which a plurality of green ceramic layers made of a dielectric material are laminated. The internal electrode is provided between ceramic layers in the ceramic element assembly and is formed by printing a conductive paste on a plurality of green ceramic layers and by baking the conductive paste concurrently with the green ceramic layers. The terminal electrode is formed by coating the end face of the ceramic element assembly with the conductive paste and by baking the coating film. In order to improve solder wettability and solder heat resistance in mounting the ceramic electronic component on a circuit substrate, etc., the terminal electrode may be subjected to a plating treatment with Ni, Sn, solder, etc.

The conductive paste for forming the terminal electrode contains a conductive component, a glass frit and an organic vehicle. In recent years, base metals such as Ni and Cu, in addition to noble metals such as Ag, Pd, and Ag/Pd, have been used as the conductive component. As the glass frit, B—Si—O glass frit may be appropriately used.

When the terminal electrode of the ceramic electronic component is formed using a conductive paste containing a conductive component made of a base metal and the terminal electrode is subjected to the plating treatment, however, the plating solution is likely to penetrate into the terminal electrode since the sintering density is lower than that of the terminal electrode formed using the conductive paste containing the conductive component made of such a noble metal as Ag/Pd, and it is feared that internal flaws are generated in the ceramic element assembly so as to cause an internal defect.

As a method for increasing the sintering density of the terminal electrode containing Cu as a conductive component, which has an especially low sintering density, for example, a method in which a baking temperature is increased can be mentioned. However, since the viscosity of softened glass is further decreased, the glass in the coating film flows into the interface between the ceramic element assembly and the electrode or flows on the surface of the terminal electrode during the baking, so that not only does a so-called "adhesion defect", in which ceramic electronic components adhere to each other with glass therebetween, frequently occur, but also the region in the coating film that the glass previously occupied becomes a cavity so as to cause penetration of the plating solution.

A method in which a glass frit having a further increased softening point is used may be suggested. In this case, however, although a liquid phase sintering due to glass and the resulting aforementioned "adhesion defect" is not likely to occur, the penetration of the plating solution still occurs due to decrease in the sintering density.

SUMMARY OF THE INVENTION

The present invention was made to solve the aforementioned problems. Accordingly, it is an object of the present invention to provide a conductive paste capable of forming a terminal electrode in which the sintering proceeds while the viscosity of the glass is maintained during the sintering of the conductive component, so that the softened glass is prevented from flowing into the interface between the ceramic element assembly and the terminal electrode or from flowing on the surface of the terminal electrode, and furthermore, a sufficient amount of glass remains in the cavity of the terminal electrode film so that an excellent seal is provided against the penetration of the plating solution, and the "adhesion defect" is prevented from occurring. It is another object of the present invention to provide a ceramic electronic component provided with the aforementioned terminal electrode.

In order to achieve the aforementioned objects, a conductive paste according to an aspect of the present invention is composed of a conductive component containing at least one of Cu and Ni, a glass frit and an organic vehicle, in which the glass frit contains at least one kind of crystallizable glass, and the sintering starting temperature of the conductive component is higher than the crystallization starting temperature of the crystallizable glass but lower than the remelting temperature of the crystallizable glass.

The aforementioned crystallizable glass is preferably B—Si—X—O glass, where X is at least one alkaline-earth metal.

The aforementioned crystallizable glass is also preferably B—Si—X—Y—O glass, where X is at least one alkaline-earth metal and Y is at least one member selected from the group consisting of Al, Cu, Ni, Zn, Mn and alkali metals.

A ceramic component according to another aspect of the present invention is provided with a ceramic element assembly and a terminal electrode formed so as to contact with the ceramic element assembly, in which the terminal electrode is formed using the aforementioned conductive paste according to the present invention.

DESCRIPTION OF THE PREFERRED EMBODIMENTS

Figure 1:
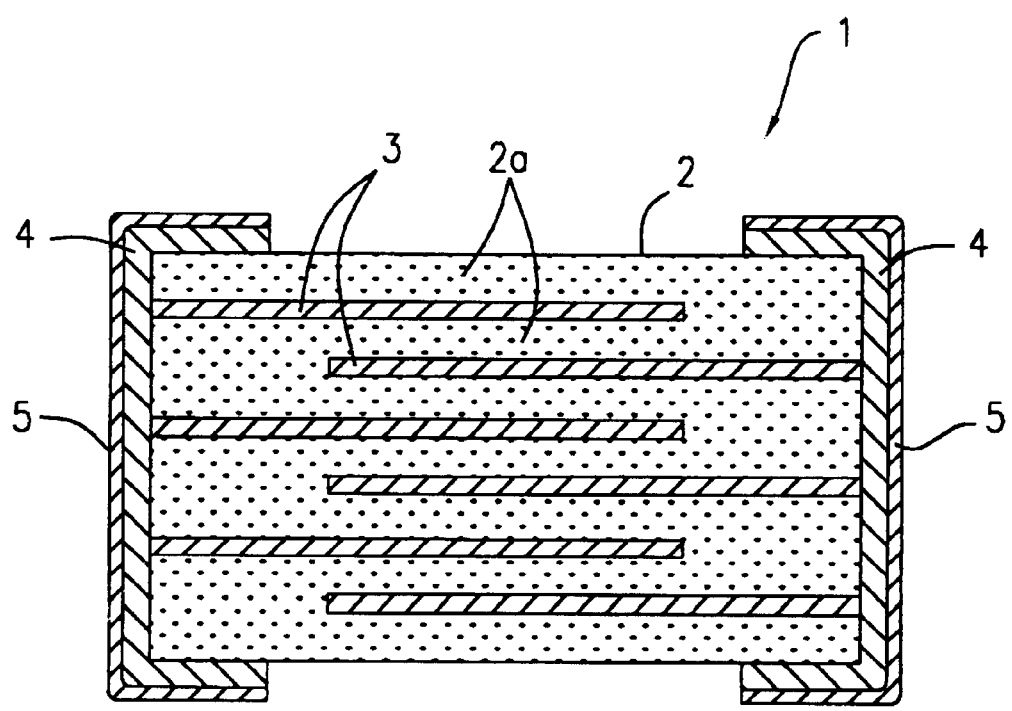
FIG. 1 is a sectional view of a ceramic electronic component according to an embodiment of the present invention.

A conductive paste according to the present invention must contains a crystallizable glass, and the sintering starting temperature of the aforementioned conductive component must be higher than the crystallization starting temperature of the aforementioned crystallizable glass and must be lower than a remelting temperature of the crystallizable glass.

When the sintering starting temperature of the conductive component is equivalent to or less than the crystallization starting temperature of the aforementioned glass frit, the glass moves from the electrode film with ease since the crystallization of the glass does not proceed at the sintering temperature of the conductive component and the glass is present as amorphous glass having fluidity, so that so-called "adhesion defect" and the penetration of the plating solution occur. On the other hand, when the sintering starting temperature of the conductive component is equivalent to or higher than the remelting temperature of the glass frit, remelting of the crystallizable glass occurs during the sintering of the conductive component so that the so-called "adhesion defect" and the penetration of the plating solution occur.

The aforementioned crystallizable glass is preferably B—Si—X—O glass, where X is at least one of the alkaline-earth metals. Since oxides of the alkaline-earth metals, such as Ba, Sr and Ca, are network-modifying oxides, crystallization is promoted when such oxides are contained in the glass. In addition, the oxides react with components of the plating solution and produce stable insoluble reaction products so as to exhibit the effect of preventing the glass from dissolving into the plating solution.

The aforementioned crystallizable glass may also be B—Si—X—Y—O glass, where X is at least one of the alkaline-earth metals, and Y is at least one member selected from the group consisting of Al, Cu, Ni, Zn, Mn and alkali metals. That is, the crystallizable glass may contain Al, Cu, Ni, Zn, Mn and alkali metals, as long as the glass can crystallize.

The constituent ratio of the conductive component and the glass frit in the conductive paste is not specifically limited, although the glass frit is preferably in the range of about 5% to 50% by volume relative to about 50% to 95% by volume of the conductive component. When the constituent ratio of the glass frit is less than about 5% by volume, the effects of the present invention are not likely to be produced. On the other hand, when the constituent ratio of the glass frit exceeds about 50% by volume, it is feared that surplus glass frit may concentrate in the vicinity of the surface of the terminal electrode so as to cause poor plating.

A laminated ceramic electronic component according to an embodiment of the present invention will be explained in detail with reference to FIG. 1. That is, a ceramic electronic component 1 is composed of a ceramic laminate 2, internal electrodes 3, terminal electrodes 4 and plating films 5.

The ceramic laminate 2 is formed by baking a green ceramic laminate in which a plurality of ceramic layers 2a, made of a dielectric material primarily containing $BaTiO_3$, are laminated.

The internal electrodes 3 are provided between the ceramic layers 2a in the ceramic laminate 2, and are formed from the conductive paste being baked concurrently with a plurality of green ceramic layers 2a printed with the conductive paste. One end edge of the internal electrodes 3 is formed so as to be exposed at one of end faces of the ceramic layers 2a.

The terminal electrodes 4 are formed by coating the end face of the ceramic laminate 2 with the conductive paste according to the present invention, and by baking these, becomes electrically and mechanically connected to one end of the internal electrodes 3 exposed at the end face of the ceramic laminate 2.

The plating films 5 are made of, for example, a plating of Sn, Ni, etc., and a solder plating, formed on the terminal electrodes 4.

The material for the ceramic laminate 2 in the ceramic electronic component according to the present invention is not limited to the aforementioned embodiment, and may be, for example, a dielectric material, e.g., $PbZrO_3$, an insulating material, a magnetic material or a semiconducting material. The number of layers of the internal electrodes 3 of the laminated ceramic electronic component according to the present invention is not limited to the aforementioned embodiment, may not be provided, or an arbitrary number of layers may be formed. The plating films 5 may not be provided or arbitrary number of layers may be formed.

EXAMPLES

First, glass frits of Glass Nos. 1 to 10 were prepared in accordance with compositional ratios as shown in Table 1. That is, predetermined amounts of starting materials, $BaCO_3$, $SiO_2$, $H_3BO_3$, $Al(OH)_3$, ZnO, CuO, NiO, $Na_2(CO_3)$, $MnO_2$, $SrCO_3$ and $CaCO_3$, were blended and mixed. The resulting mixture was made molten in a platinum pot at a temperature in the range of 1,000° C. to 1,500° C. The molten mixture was dropped on a metallic roll and was quenched so as to vitrify the glass. The resulting glass cullet was roughly ground with an agate mortar, and thereafter, was pulverized with a ball mill using zirconia balls as media, so as to produce the glass frits of Glass Nos. 1 to 10.

Regarding each of the glass frits of Glass Nos. 1 to 10, TG-DTA was measured and the softening point, the crystallization starting temperature (Tc), crystallization peak temperature (Tcp) and the remelting temperature were determined from the DTA curve. The results thereof are summarized in Table 1.

TABLE 1

| Glass No. | Composition (Glass Frit) | | | | | | | | | | | Softening point (° C.) | Tc (° C.) | Tcp (° C.) | Remelting temperature (° C.) |
| | $B_2O_3$ | $SiO_2$ | BaO | SrO | CaO | $Al_2O_3$ | CuO | NiO | $Na_2O$ | MnO | ZnO | | | | |
| --- | --- | --- | --- | --- | --- | --- | --- | --- | --- | --- | --- | --- | --- | --- | --- |
| 1 | 20 | 50 | 30 | | | | | | | | | 745 | 840 | 872 | 930 |
| 2 | 35 | 15 | 35 | | | 10 | 5 | | | | | 645 | 703 | 750 | 840 |
| 3 | 14 | 33 | 33 | | | 9 | 7 | | 4 | | | 645 | 694 | 720 | 884 |
| 4 | 24 | 24 | 34 | | | 7 | 7 | | 4 | | | 630 | 660 | 705 | 890 |
| 5 | 20 | 16 | 22 | | | 7 | 7 | | | | 28 | 640 | 660 | 715 | 878 |
| 6 | 25 | 21 | | | | 3 | | | | 14 | 37 | 561 | 618 | 640 | 780 |
| 7 | 22 | 13 | | 35 | | 8 | 7 | | | | 15 | 648 | 820 | 890 | 920 |
| 8 | 24 | 14 | 21 | | 5 | 8 | | 3 | | | 25 | 675 | 705 | 766 | 910 |
| 9 | 45 | 12 | | | | 1 | | | 12 | | 30 | 550 | None (Amorphous) | | |
| 10 | 8 | 40 | 17 | | 32 | 3 | | | | | | 770 | None (Amorphous) | | |

Next, Cu powders having sintering starting temperatures of 780° C., 820° C. and 845° C. were prepared as conductive components represented by Symbols A, B and C, respectively, as shown in Table 2. Regarding the sintering starting temperature of the Cu powder, displacements during the heating of the Cu powder worked into a compact powder were measured, and the temperature at which the compact powder started to shrink was defined as the sintering starting temperature.

TABLE 2

| Symbol | Conductive component (Cu powder) | |
| --- | --- | --- |
| | Average particle diameter (μm) | Sintering starting temperature (° C.) |
| A | 0.5 | 780 |
| B | 2.0 | 820 |
| C | 2.0 | 845 |

20% by volume of the glass frits of Glass Nos. 1 to 10 having different compositional ratios as shown in Table 1 and 80% by volume of conductive components of Symbols A, B and C made of Cu powders having different sintering starting temperatures as shown in Table 2 were mixed in the combinations shown in Table 3, and appropriate amounts of an organic vehicle composed of 80% by weight of terpineol and 20% by weight of an acrylic resin were added thereto. The resulting mixtures were mixed and were dispersed with a three-roll mill so as to produce conductive pastes of Samples 11 to 42.

Subsequently, monolithic ceramic capacitors of Samples 11 to 42 were produced using the resulting conductive pastes of Samples 11 to 42.

Ceramic layers primarily composed of BaTiO₃ were prepared. The surfaces of a predetermined number of ceramic layers were printed with electrode films, which become internal electrodes having a conductive component of Ni, so that only one end edge of each of the electrode films extended to an end face of the ceramic layers. A predetermined number of the aforementioned ceramic layers were laminated and were press-adhered so as to prepare a plurality of green ceramic element assembly.

Both end faces of the green ceramic element assembly were immersion-coated with the conductive pastes of Samples 11 to 42, and were dried at 120° C. for 10 minutes. Thereafter, each of the resulting green ceramic element assembly was baked in a neutral atmosphere at the baking temperature as shown in Table 3 for 10 minutes at peak so as to form a pair of terminal electrodes electrically and mechanically connected to the internal electrodes. A total of 10,000 pieces of components before plating treatment of each of Samples 11 to 42 were produced. The baking temperatures of Samples 11, 13 to 17, and 19 to 42 were controlled to be the sintering starting temperatures of the conductive components plus 20° C., that of Sample 12 was controlled to be the sintering starting temperature of the conductive component plus 40° C., and that of Sample 18 was controlled to be the sintering starting temperature of the conductive component.

Ni plating films were formed by an electrolytic plating treatment on the pairs of terminal electrodes of the components before plating treatment of each of Samples 11 to 42, and furthermore, Si plating films were formed on the Ni plating films by the electrolytic plating treatment so as to produce monolithic ceramic capacitors of Samples 11 to 42.

Subsequently, the difference between the sintering starting temperature of the conductive component and the crystallization starting temperature of the glass frit, the difference between the remelting temperature of the glass frit and the sintering starting temperature of the conductive component, the internal defect rate, and the adhesion defect rate were measured. The results thereof and the evaluation results are summarized as shown in Table 3.

Regarding the adhesion defect rate, the number of the components in which the so-called "adhesion defect" occurred, that is, the components before plating treatment of each of Samples 11 to 42 adhered to each other with glass, concentrated on the surface of the terminal electrode, therebetween, were counted, and the ratio thereof relative to the total number of the 10,000 pieces of sample components was determined.

Regarding the internal defect rate, the components before plating treatment of each of Samples 11 to 42, except for the components in which the adhesion defect had occurred, were subjected to a plating treatment and were examined. The number of the components in which internal defects, such as a crack, had occurred was counted so as to determine the ratio thereof relative to the total number of the examined components.

Regarding the evaluation, a sample being within the scope of the present invention was indicated by ○, in which the adhesion defect rate is less than 0.1% and the internal defect rate is less than 0.1%. A sample being outside of the scope of the present invention was indicated by x, in which at least one of the adhesion defect rate and the internal defect rate is 0.1% or more.

TABLE 3

| Sample | Glass frit | Conductive component | Baking temperature (° C.) | Ceramic electronic component Sintering starting temperature - Crystallization temperature (° C.) | Remelting temperature - Sintering starting temperature (° C.) | Internal defect rate (%) | Adhesion defect rate (%) | Evaluation |
| --- | --- | --- | --- | --- | --- | --- | --- | --- |
| 11 | 1 | A | 800 | −60 | 150 | 0.15 | 0.15 | x |
| 12 | 1 | A | 820 | −60 | 150 | 0.09 | 0.19 | x |
| 13 | 1 | B | 840 | −20 | 110 | 0.08 | 0.13 | x |
| 14 | 1 | C | 865 | 5 | 85 | 0.02 | 0.03 | ○ |
| 15 | 2 | A | 800 | 77 | 60 | 0.02 | 0.02 | ○ |
| 16 | 2 | B | 840 | 117 | 20 | 0.09 | 0.08 | ○ |
| 17 | 2 | C | 865 | 142 | −5 | 0.14 | 0.21 | x |
| 18 | 2 | C | 845 | 142 | −5 | 0.21 | 0.05 | x |
| 19 | 3 | A | 800 | 86 | 104 | 0.03 | 0.09 | ○ |
| 20 | 3 | B | 840 | 126 | 64 | 0.02 | 0.07 | ○ |
| 21 | 3 | C | 865 | 151 | 39 | 0.00 | 0.03 | ○ |
| 22 | 4 | A | 800 | 120 | 110 | 0.05 | 0.02 | ○ |
| 23 | 4 | B | 840 | 160 | 70 | 0.04 | 0.03 | ○ |
| 24 | 4 | C | 865 | 185 | 45 | 0.04 | 0.04 | ○ |
| 25 | 5 | A | 800 | 120 | 98 | 0.05 | 0.02 | ○ |
| 26 | 5 | B | 840 | 160 | 58 | 0.03 | 0.01 | ○ |

TABLE 3-continued

| Sample | Glass frit | Conductive component | Baking temperature (° C.) | Ceramic electronic component Sintering starting temperature - Crystallization temperature (° C.) | Remelting temperature - Sintering starting temperature (° C.) | Internal defect rate (%) | Adhesion defect rate (%) | Evaluation |
|---|---|---|---|---|---|---|---|---|
| 27 | 5 | C | 865 | 185 | 33 | 0.07 | 0.06 | ○ |
| 28 | 6 | A | 800 | 162 | 0 | 0.68 | 0.01 | x |
| 29 | 6 | B | 840 | 202 | −40 | 0.81 | 0.27 | x |
| 30 | 6 | C | 865 | 227 | −65 | 1.02 | 0.49 | x |
| 31 | 7 | A | 800 | −40 | 140 | 0.09 | 0.15 | x |
| 32 | 7 | B | 840 | 0 | 100 | 0.05 | 0.11 | x |
| 33 | 7 | C | 865 | 25 | 75 | 0.07 | 0.02 | ○ |
| 34 | 8 | A | 800 | 75 | 130 | 0.07 | 0.04 | ○ |
| 35 | 8 | B | 840 | 115 | 90 | 0.05 | 0.08 | ○ |
| 36 | 8 | C | 865 | 140 | 65 | 0.06 | 0.07 | ○ |
| 37 | 9 | A | 800 | None (Amorphous) | | 0.08 | 0.19 | x |
| 38 | 9 | B | 840 | None (Amorphous) | | 0.06 | 0.58 | x |
| 39 | 9 | C | 865 | | | 0.07 | 1.02 | x |
| 40 | 10 | A | 800 | None (Amorphous) | | 0.95 | 0.08 | ○ |
| 41 | 10 | B | 840 | None (Amorphous) | | 0.21 | 0.19 | x |
| 42 | 10 | C | 865 | | | 0.08 | 0.57 | x |

As is clear from Table 3, regarding each of the laminated ceramic electronic components of Samples 14 to 16, 19 to 27, and 33 to 36, in which one of the glass frits of Glass Nos. 1 to 8 made of crystallizable glass was contained, and the sintering starting temperature of the conductive component was higher than the crystallization starting temperature of the crystallizable glass and was lower than the remelting temperature of the crystallizable glass, the adhesion defect rate was 0.01 to 0.09%, and the internal defect rate was 0 to 0.09%. Since these Samples exhibited excellent results in which every value was less than 0.1%, these Samples were within the scope of the present invention.

It is clear from comparisons made between Samples 11 and 12, and between Samples 17 and 18, in which same glass frit and same conductive component are used, but the baking temperatures are different, that the adhesion defect rate decreases with a decrease in the sintering temperature, although the internal defect rate is slightly degraded.

On the other hand, regarding each of Samples 11 to 13, 31 and 32, in which one of the glass frits of Glass Nos. 1 to 8 made of crystallizable glass was contained and the sintering starting temperature of the conductive component was equivalent to or less than the crystallization starting temperature of the crystallizable glass, at least one of the adhesion defect rate and the internal defect rate was 0.1% or more. Since these Samples were inferior, these Samples were in the outside of the scope of the present invention.

Regarding each of Samples 17, 18 and 28 to 30, in which one of the glass frits of Glass Nos. 1 to 8 made of crystallizable glass was contained and the sintering starting temperature of the conductive component was equivalent to or higher than the remelting temperature of the crystallizable glass, at least one of the adhesion defect rate and the internal defect rate was 0.2% or more. Since these Samples were inferior, these Samples were in the outside of the scope of the present invention.

Regarding each of Samples 37 to 42, in which the glass frits of Glass No. 9 or made of amorphous glass was contained, at least one of the adhesion defect rate and the internal defect rate was high as 0.1% or more, so that these Samples were inferior.

As described above, the conductive paste according to the present invention is composed of the conductive component containing at least one of Cu and Ni, the glass frit and the organic vehicle, in which the glass frit contains at least one kind of crystallizable glass, and the sintering starting temperature of the conductive component is higher than the crystallization starting temperature of the crystallizable glass but is lower than the remelting temperature of the crystallizable glass. Accordingly, there is an effect of providing the terminal electrode in which sintering can proceed while the viscosity of the glass is maintained during the sintering of the conductive component, so that the softened glass is prevented from flowing into the interface between the ceramic element assembly and the terminal electrode or from flowing on the surface of the terminal electrode, and furthermore, a sufficient amount of glass remains in the cavity of the terminal electrode film, so that an excellent seal is provided against the penetration of the plating solution and the so-called "adhesion defect" is prevented from occurring. In addition, there is an effect of providing the ceramic electronic component with resistance to the occurrence of internal defects.

The ceramic component according to the present invention is provided with the ceramic element assembly and the terminal electrode formed so as to contact with the ceramic element assembly, in which the terminal electrode is formed using the conductive paste according to the present invention. Accordingly, there are effects of providing the excellent seal against the penetration of the plating solution, and of preventing so-called "adhesion defect" from occurring.

What is claimed is:

1. A conductive paste, comprising:

a conductive component comprising at least one of Cu and Ni; a glass frit; and an organic vehicle, wherein said glass frit comprises at least one crystallizable glass having a crystallization starting temperature higher than the sintering starting temperature of said conductive component and a remelting temperature lower than the sintering starting temperature of said conductive component.

2. A conductive paste according to claim 1, wherein said crystallizable glass is B—Si—X—O glass in which X is at least one alkaline-earth metal.

3. A conductive paste according to claim 2, wherein said glass frit is present in an amount of about 5 to 50 volume % of the total volume of the glass frit and conductive component.

4. A conductive paste according to claim 3, wherein X is at least one of Ba, Sr and Ca, and the conductive component comprises Cu.

5. A conductive paste according to claim 2, wherein X is at least one of Ba, Sr and Ca.

6. A conductive paste according to claim 1, wherein said crystallizable glass is B—Si—X—Y—O glass in which X is at least one alkaline-earth metal, and Y is at least one member selected from the group consisting of Al, Cu, Ni, Zn, Mn and alkali metals.

7. A conductive paste according to claim 6, wherein said glass frit is present in an amount of about 5 to 50 volume % of the total volume of the glass frit and conductive component.

8. A conductive paste according to claim 7, wherein X is at least one of Ba, Sr and Ca, and the conductive component comprises Cu.

9. A conductive paste according to claim 6, wherein X is at least one of Ba, Sr and Ca.

10. A ceramic electronic component, comprising:
a ceramic element assembly having a surface; and
a terminal electrode contacting said ceramic element assembly surface,
wherein said terminal electrode is a baked conductive paste according to claim 9.

11. A ceramic electronic component, comprising:
a ceramic element assembly having a surface; and
a terminal electrode contacting said ceramic element assembly surface,
wherein said terminal electrode is a baked conductive paste according to claim 8.

12. A ceramic electronic component, comprising:
a ceramic element assembly having a surface; and
a terminal electrode contacting said ceramic element assembly surface,
wherein said terminal electrode is a baked conductive paste according to claim 7.

13. A ceramic electronic component, comprising:
a ceramic element assembly having a surface; and
a terminal electrode contacting said ceramic element assembly surface,
wherein said terminal electrode is a baked conductive paste according to claim 6.

14. A ceramic electronic component, comprising:
a ceramic element assembly having a surface; and
a terminal electrode contacting said ceramic element assembly surface,
wherein said terminal electrode is a baked conductive paste according to claim 5.

15. A ceramic electronic component, comprising:
a ceramic element assembly having a surface; and
a terminal electrode contacting said ceramic element assembly surface,
wherein said terminal electrode is a baked conductive paste according to claim 4.

16. A ceramic electronic component, comprising:
a ceramic element assembly having a surface; and
a terminal electrode contacting said ceramic element assembly surface,
wherein said terminal electrode is a baked conductive paste according to claim 3.

17. A ceramic electronic component, comprising:
a ceramic element assembly having a surface; and
a terminal electrode contacting said ceramic element assembly surface,
wherein said terminal electrode is a baked conductive paste according to claim 2.

18. A ceramic electronic component, comprising:
a ceramic element assembly having a surface; and
a terminal electrode contacting said ceramic element assembly surface,
wherein said terminal electrode is a baked conductive paste according to claim 1.

* * * * *